Figures 1, 2:
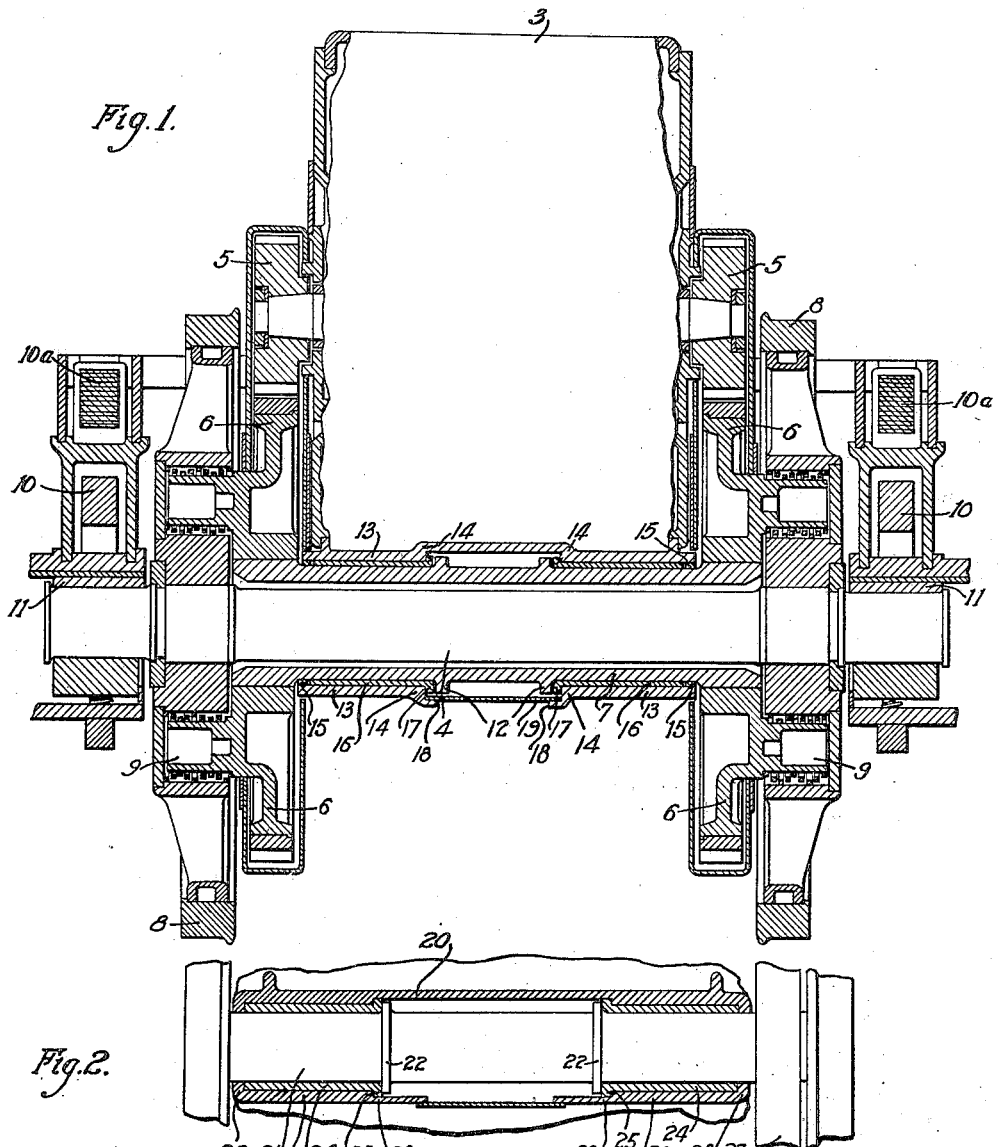

B. S. MOORE.
BEARING.
APPLICATION FILED JAN. 23, 1920.

1,424,315.

Patented Aug. 1, 1922.

WITNESSES:
Geo. D. Barrett
F. A. Lind.

INVENTOR
Benjamin S. Moore.
BY
Wesley G. Carr
ATTORNEY

UNITED STATES PATENT OFFICE.

BENJAMIN S. MOORE, OF WILKINSBURG, PENNSYLVANIA, ASSIGNOR TO WESTINGHOUSE ELECTRIC AND MANUFACTURING COMPANY, A CORPORATION OF PENNSYLVANIA.

BEARING.

1,424,315.   Specification of Letters Patent.   Patented Aug. 1, 1922.

Application filed January 23, 1920. Serial No. 353,502.

*To all whom it may concern:*

Be it known that I, BENJAMIN S. MOORE, a citizen of the United States, and a resident of Wilkinsburg, in the county of Allegheny and State of Pennsylvania, have invented a new and useful Improvement in Bearings, of which the following is a specification.

My invention relates to bearings for use on vehicles, such, for example, as electric locomotive, railway cars and the like, and it has for its object to provide a simple and novel type of bearing for supporting the motor on the wheel axle which shall be particularly adapted to prevent the entry of any foreign material whatever to the bearing surfaces.

In the accompanying drawing, I show, in Fig. 1, my invention embodied in a quill drive on the wheel axle of an electric locomotive, one truck of which is shown in section; and in Fig. 2, I show my invention embodied in a direct drive connection on a railway car.

In the manufacture of vehicles requiring the supporting of the power motors on the wheel axles, a number of different types of bearings have been used. Of these different types, the most satisfactory has been that in which the motor is supported upon the central part of the axle or quill by means of axle bearings and is also provided with thrust-bearing surfaces which engage a portion of one of the resilient drive members to prevent lateral movement of the car wheels with respect to the motor or motors. A common fault of all of the previously used structures is that it was practically impossible to prevent the admission of dust and other foreign material to the bearing surfaces.

By my invention, I provide a new type of bearing which consists of a novel combination and arrangement of an axle and a thrust bearing that may readily be completely enclosed within a relatively simple casing, thus preventing the admission of any foreign matter whatever.

For a better understanding of my invention, reference may now be had to the drawings, in Fig. 1 of which I show an electric motor 3 supported upon, and connected so as to drive, a wheel axle 4 by means of gears 5 mounted upon the motor axle and gears 6 mounted upon a quill 7 surrounding the axle 4 and meshing with the gears 5. The quill 7 drives wheels 8, mounted upon the wheel axle 4, by means of resilient connections 9, which may be of any desired type and do not constitute any portion of my present invention. The weight of the cab of the engine is borne by the frame members 10 which are supported upon the ends of the wheel axles 4 by means of journal boxes 11, through resilient members 10ª. The ends of the quill 7 are in engagement with the hubs of the wheels 8, preventing relative lateral movement thereof.

The central portion of the quill is provided with spaced thrust collars 12, and the axle-bearing member 13 is provided with internal annular shoulders 14 that are adjacent to, but longitudinally displaced from, the collars 12, and its outer ends are provided with internal annular flanges 15. Interposed between the quill 7 and the axle-bearing member 13, adjacent to the ends of the latter, are liners 16 the inner ends of which are provided with annular flanges 17, that are located between the collars 12 and the shoulders 14. The liners 16 may readily be replaced when worn or otherwise impaired and the members associated therewith are so constructed and assembled, as above described, as to completely enclose the axle-bearing surfaces and the thrust-bearing surfaces and thus prevent the admission of foreign matter thereto.

If desired for purposes of inspection, an opening 18, may be left in one portion of the bearing member, and a cover 19 may be provided therefor so as to prevent the admission of injurious material therethrough. The bearing member 13 comprises a main upper bearing portion and a lower axle cap member, as is usual in such structures, both of which are herein jointly designated as a bearing member throughout this specification. If it is desired, the thrust collars 12 may be combined into a single enlarged portion of the quill of greater diameter than the remainder thereof, this enlarged portion being provided with thrust bearing surfaces on both ends thereof.

In Fig. 2, I show an axle-bearing member 20 supporting the motor and surrounding a wheel-axle 21. The wheel-axle 21 is provided with thrust collars 22 which engage flanges 25 of liners 24 that are similar to the liners 16 of Fig. 1. The axle bearing member 20 is provided with annular shoulders, corresponding to the shoulders 14, as described in connection with Fig. 1. Flanges 26 of the bearing member 20 engage the axle outside of the liner members 24, these flanges being similar to the flanges 15 shown in Fig. 1. The chief distinction between the structures of Fig. 1 and Fig. 2 is that, in the structure of Fig. 1, the wheels are driven through a resilient-quill drive, whereas, in the structure of Fig. 2, the motor is directly connected to the wheel-axle through gears within a gear box 27.

From the drawings, it will be apparent that my invention is equally adaptable to an electric locomotive provided with a quill or other drive and to a railway car provided with a simple direct drive. Also, that, by the particular arrangement of the thrust and axle bearings, with respect to each other and to the shaft, the relatively simple combined bearing and cover member may be utilized to totally enclose all of the bearing surfaces, thus preventing the admission of foreign material thereto.

While I have shown but one form of my invention, and have described in detail but a single application of the same, it will be obvious to those skilled in the art that it is not so limited but that various minor modifications and changes may be made therein without departing from the spirit and scope thereof, and I desire, therefore, that only such limitations shall be placed thereupon as are imposed by the prior art, or as are set forth in the appended claims.

I claim as my invention:

1. In a vehicle, an axle member provided with axle and thrust-bearing surfaces, axle and thrust bearing members engaging said surfaces, and cover means completely enclosing all of said bearing surfaces.

2. In a vehicle, a wheel-axle provided with a thrust collar, a thrust-bearing member engaging said collar, axle bearings engaging the said shaft outside of said collar, and cover means completely enclosing all of said bearing surfaces.

3. In a railway vehicle, a wheel axle provided with two spaced centrally disposed thrust-bearing surfaces, bearing means comprising two spaced thrust-bearing members engaging said surfaces, and an axle-bearing surface engaging the said shaft adjacent said thrust-bearing surfaces, and a cover member enclosing said bearing surfaces.

4. In a vehicle, a wheel axle provided with two spaced centrally disposed thrust collars, a bearing member mounted on each end of said axle and comprising a combined axle and thrust bearing, and a cover member enclosing said bearings.

5. In a vehicle, a wheel axle provided with two spaced centrally disposed thrust collars, a plurality of bearing members mounted on said axle and each comprising a combined axle and thrust bearing, liners interposed between said axle surfaces and said bearing-member surfaces, and means integral with said bearing members for enclosing said bearing liners, axle collars and the portion of the axle intermediate said bearings.

6. In a vehicle, a wheel axle provided with two spaced centrally disposed thrust collars, bearing liners engaging said thrust collars and a portion of the shaft adjacent thereto, and means for enclosing said bearings comprising two bearing members engaging said bearing liners and means integral with said bearing members for engaging said shaft outside of said bearing liners and for enclosing the central portion of said shaft.

7. In a vehicle, a wheel axle provided with two oppositely disposed thrust-bearing surfaces on the central portion thereof and with an axle-bearing surface on each side thereof, and a bearing surrounding said axle and provided with both thrust and axle-bearing surfaces adapted to engage coacting surfaces on said axle.

In testimony whereof, I have hereunto subscribed my name this 5th day of January, 1920.

BENJAMIN S. MOORE.